United States Patent [19]
Lawson

[11] Patent Number: 5,733,413
[45] Date of Patent: Mar. 31, 1998

[54] METHOD FOR REMOVING CONTAMINATES FROM AQUEOUS PAPER PULP

[75] Inventor: J. Alan Lawson, Dublin, Ga.

[73] Assignee: Southeast Paper Manufacturing Company

[21] Appl. No.: 668,964

[22] Filed: Jun. 18, 1996

[51] Int. Cl.[6] .................. B03B 5/62; D21C 5/02
[52] U.S. Cl. .................. 162/55; 162/232; 209/173; 209/157; 209/210
[58] Field of Search .................. 162/55, 232; 209/156, 209/157, 158, 159, 160, 161, 173, 208, 210

[56] References Cited

U.S. PATENT DOCUMENTS

| | | | |
|---|---|---|---|
| 4,199,110 | 4/1980 | Eriksson | 241/20 |
| 4,271,010 | 6/1981 | Guarascio | 209/211 |
| 4,332,638 | 6/1982 | Mauer et al. | 162/4 |
| 4,818,375 | 4/1989 | Dorph | 209/18 |
| 4,848,674 | 7/1989 | Hunter | 241/16 |
| 4,994,176 | 2/1991 | Yakunin et al. | 209/157 |
| 5,061,370 | 10/1991 | Ferland et al. | 210/194 |
| 5,397,469 | 3/1995 | Young | 210/304 |
| 5,407,538 | 4/1995 | Lamort | 162/232 |
| 5,478,441 | 12/1995 | Hamilton | 162/189 |
| 5,580,446 | 12/1996 | Markham | 210/202 |

FOREIGN PATENT DOCUMENTS

| | | |
|---|---|---|
| 0 570 757 A1 | 11/1993 | European Pat. Off. . |
| 1475422 | 6/1977 | United Kingdom . |
| 91/17304 | 11/1991 | WIPO ................. 162/55 |

OTHER PUBLICATIONS

Michel Marson, "New lightweight cleaner units solve mill's plastic problems", Pulp & Paper, pp. 93–96, Jun. 1990.

Ferguson, L.D., "Through–Flow Cleaners," Paper presented at 1993 Deinking Short Course at Indianapolis, pp. 1–9, (Atlanta, GA, USA: TAPPI Press, 1992).

*Primary Examiner*—Donald E. Czaja
*Assistant Examiner*—Jose A. Fortuna
*Attorney, Agent, or Firm*—Jones & Askew

[57] ABSTRACT

The present invention provides a method for decontaminating aqueous paper pulp comprising a decontaminating cell. The decontaminating cell has an upper light contaminate collection hood and/or a lower heavy contaminate collection trough. Paper pulp is provided to the cell under a pulp head sufficient to purge the contaminates therefrom.

8 Claims, 3 Drawing Sheets

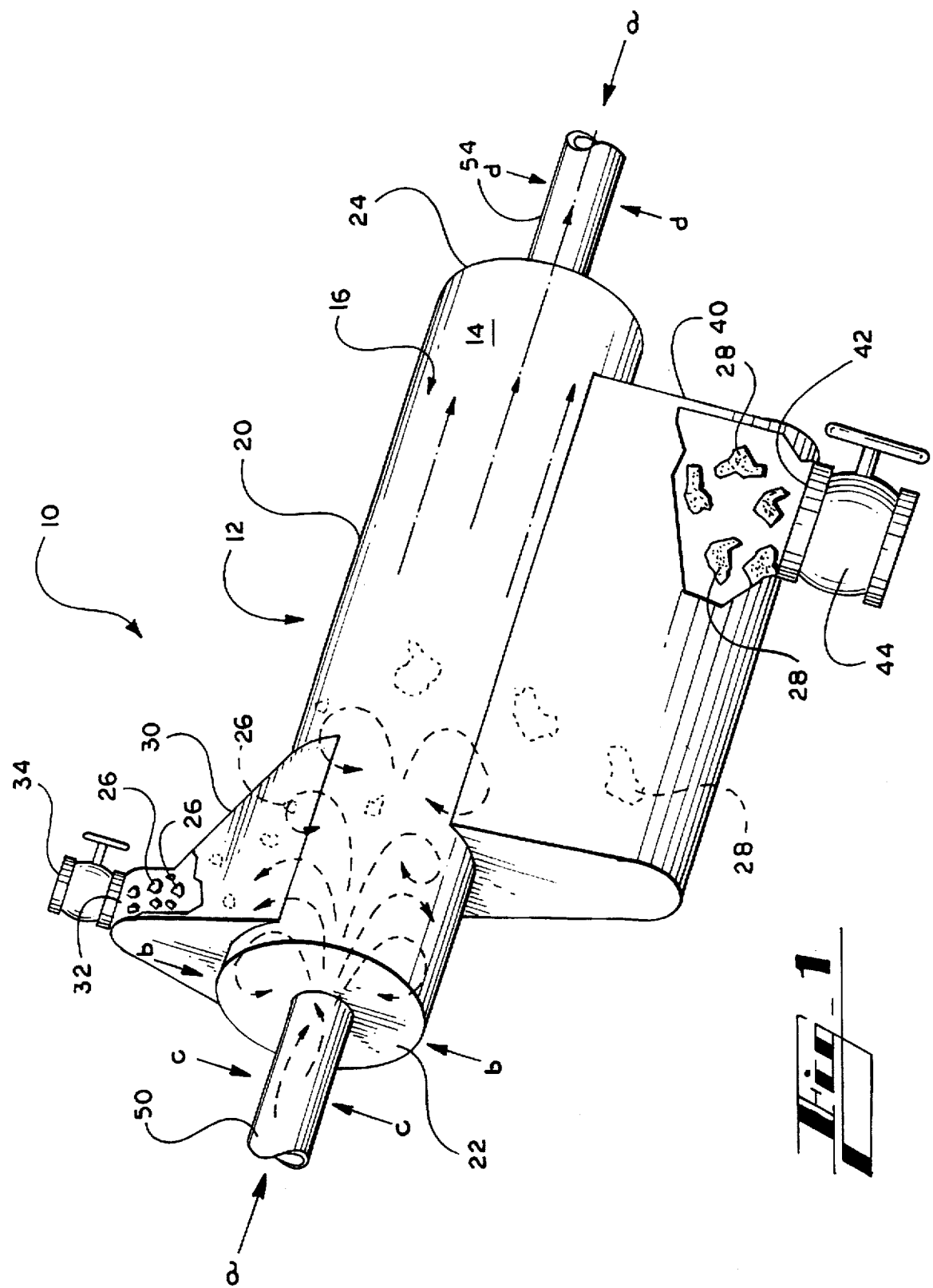
FIG_1

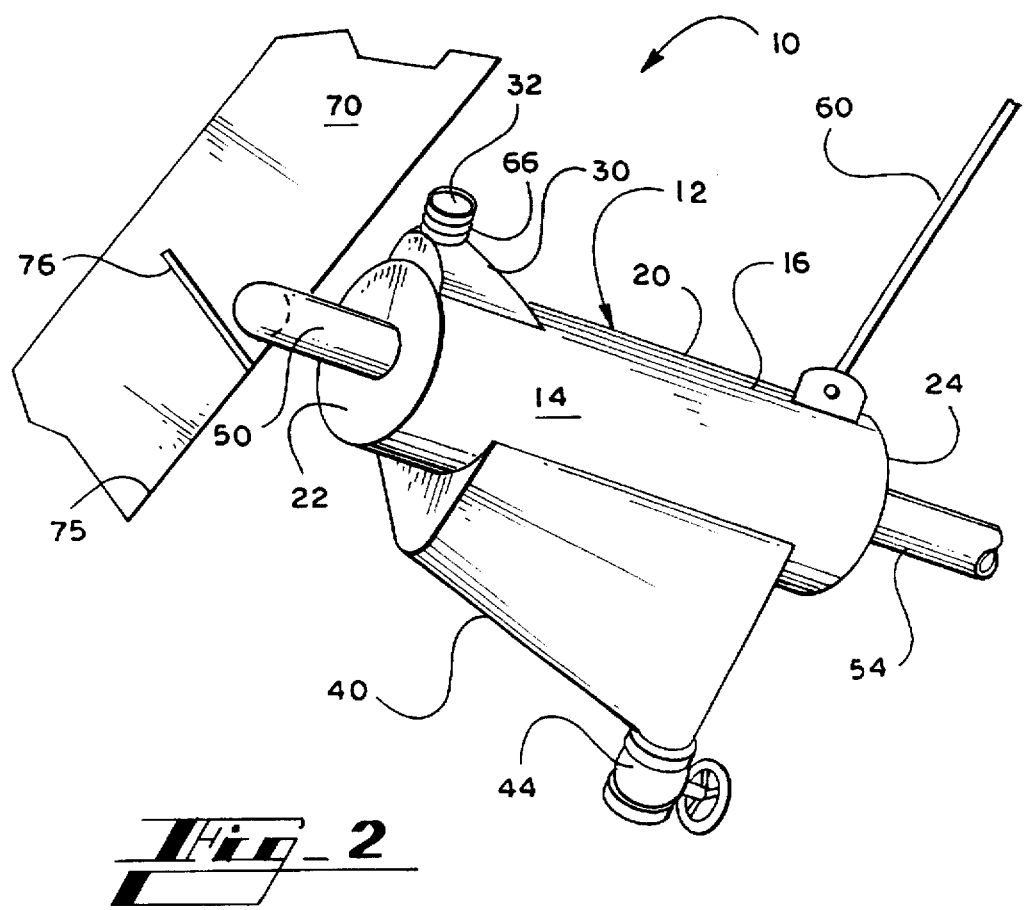
Fig_2
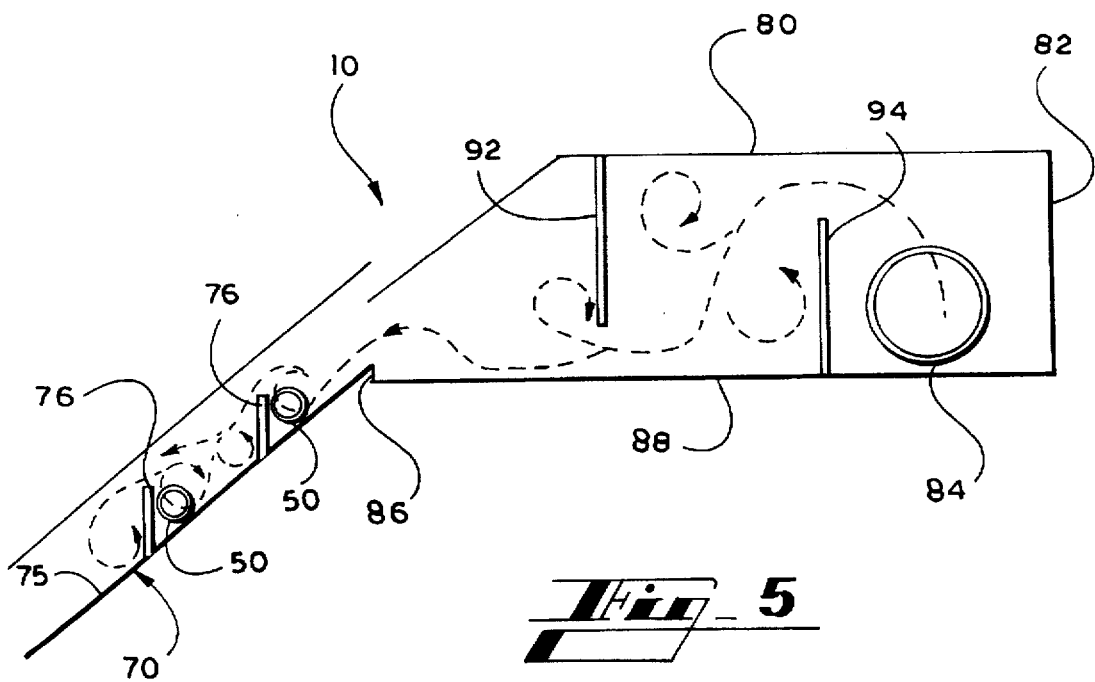
Fig_5

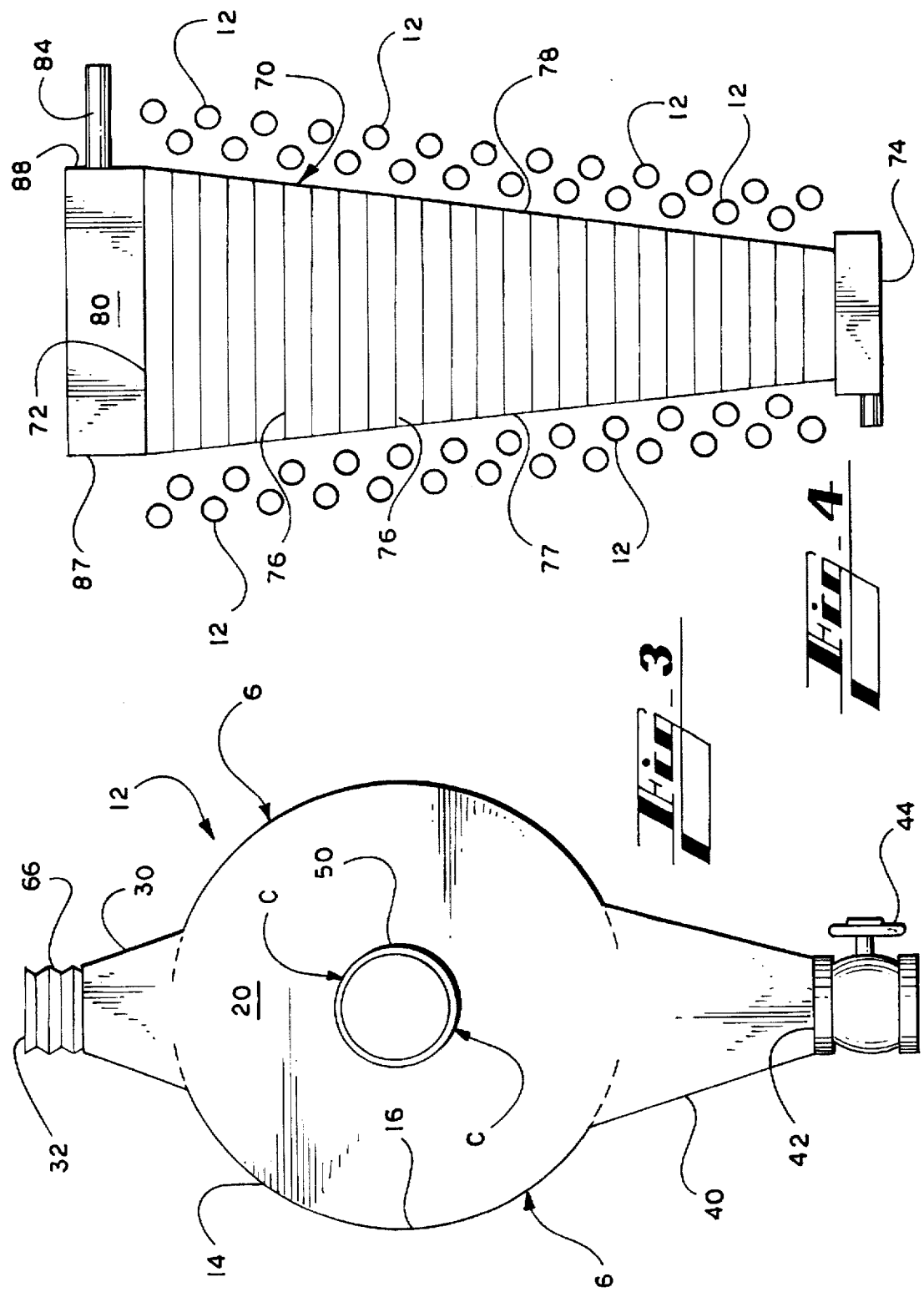

METHOD FOR REMOVING CONTAMINATES FROM AQUEOUS PAPER PULP

FIELD OF THE INVENTION

This invention relates in general to the manufacture of paper products from aqueous paper pulp.

BACKGROUND OF THE INVENTION

In the art of paper manufacturing, decontamination of the paper pulp is of primary importance to achieve a consistent paper product. In particular, recycling waste paper requires extensive cleansing of the aqueous paper pulp to remove extraneous contaminates. Waste paper materials present a challenge to provide an economically feasible means of recycling which yields an acceptable paper product.

Contaminates may be grouped into one of three classes. First, elongated flexible materials, such as pieces cord, fabrics and wire can be removed from the pulp relatively efficiently by a ragger, well-known in the art. A ragger is generally a rope trailing in the pulper vat upon which elongated material becomes entwined. Second, heavy materials, such as rocks and metal pieces, are typically removed with increased effort by screen filters or traps. Finally, light weight contaminates, such as plastics, styrofoam, wood, adhesives and entrained air, can be the most difficult to remove. Various approaches to the removal of light weight contaminates have been proposed, including screens and skimmer devices.

Pulp fiber screening technology has practical limits defined by screen pore size and hydraulic pressure. As finer screens have been developed to filter unwanted contaminates, increased hydraulic horsepower has been required to drive the pulp therethrough. However, the high degree of screening currently required to produce acceptable quality paper results in energy inefficiencies. The removal of light weight contaminates, such as foldable bits of plastic sheeting, are especially problematic to remove by conventional screening techniques.

Prior art collection traps for light weight contaminates are also unsatisfactory. Most such traps provide an open collection area for buoyant light weight contaminates, which are then skimmed off the top. This skimming action agitates the rising light weight contaminates, and recirculates them into the pulp batch. Furthermore, this system requires an undesirable number of moving parts, which increases the likelihood of machine failure.

Traps for heavy contaminates in the prior art are also inadequate. Some models include a lower heavy contaminate collection pocket, which is periodically cleared by a grapple lowered from the top. Again, this requires unnecessary machinery and produces circulatory agitation, which prevents both light and heavy contaminates from efficiently separating.

Furthermore, such prior art devices do not permit a continuously adjustable range of decontamination depending upon the quality of the paper product desired. Prior art pulp decontaminators are also incapable of processing sufficiently large amounts of pulp to create an economy of scale.

Therefore, there exists in the art a long felt need for an improved pulp decontamination apparatus. Despite the apparent need for such pulp processing alternatives, there have been none which satisfactorily provide these desirable qualities. Accordingly, there is a need in the art for an improved apparatus and method for decontaminating pulp.

OBJECTS OF THE INVENTION

Thus, it is an object of the present invention to provide an improved apparatus for decontaminating aqueous paper pulp.

It is an object of the invention to provide a pulp decontaminating apparatus that has an improved configuration for removing light contaminates.

It is also an object of the invention to provide a pulp decontaminating apparatus that has an improved configuration for removing heavy contaminates.

It is also an object of the invention to provide an apparatus that can be selectively adjusted for removing pulp decontaminates to a desired degree.

It is also an object of the invention to provide a plurality of such individual pulp decontaminating devices to create an efficient economy of scale.

Other objects, features, and advantages of the present invention will become apparent upon review of the following description of preferred embodiments and the appended drawings and claims.

SUMMARY OF THE INVENTION

The present invention provides an apparatus for decontaminating aqueous paper pulp comprising a decontaminating cell. The decontaminating cell has an upper light contaminate collection hood and/or a lower heavy contaminate collection trough. Paper pulp is provided to the cell under a pressure head sufficient to purge the contaminates therefrom. A method of decontaminating aqueous paper pulp is provided, as well as products made from the method.

BRIEF DESCRIPTION OF THE DRAWINGS

FIG. 1 is a perspective view of a cell according to the present invention for decontaminating aqueous paper pulp.

FIG. 2 is a perspective view of a cell according to the present invention for decontaminating aqueous paper pulp having a means for adjusting the decline of the longitudinal axis.

FIG. 3 is a front end view of the cell of FIG. 1.

FIG. 4 is a schematic front view of a pulp server tray according to the present invention for providing paper pulp to a plurality of decontaminating cells.

FIG. 5 is a cross-section view of a head box and server tray according to the present invention, detailing several pulp agitating members therein.

DETAILED DESCRIPTION

The invention contemplates that the apparatus can be used for decontaminating aqueous paper pulp from a variety of different sources. Aqueous paper pulp is preferably provided in a slurry form comprising wastepaper, such as recycled newsprint, mixed with a selected amount of water in a large, open-topped pulper tub. The wastepaper is pulped to paper fiber by impact with a rotary blade and vigorous agitation. The pulp may be mixed with more or less water, whitewater or other aqueous carrier, to provide an intended viscosity. The exact composition of the aqueous paper pulp will vary somewhat, however, preferably, the aqueous paper pulp is about 0.1% to 10% paper fiber, and more preferably about 2% paper fiber.

By "light contaminate" is meant any undesirable materials in the paper pulp which tend to rise upwards through the aqueous paper fiber solution due to a buoyancy effect caused by a difference in specific gravity. Light contaminates can include for example plastics, wood, styrofoam, chemicals, adhesives and air bubbles. By "heavy contaminate" is meant any undesirable materials in the paper pulp which tend to sink downwards through the aqueous paper fiber solution due to gravity. Heavy contaminates can include for example rocks and metal materials. By "decontaminating aqueous paper pulp" is meant that at least a portion of the light and/or heavy contaminates contained in an aqueous paper pulp are separated from the paper fiber. The invention contemplates that the apparatus may be used to separate other aqueous mixtures, in addition to paper pulp.

Referring now to the drawings, like numerals refer to like parts throughout the several views. As seen in FIGS. 1 and 2, the apparatus 10 for decontaminating aqueous paper pulp has an elongated cell 12 with a longitudinal axis taken along line a—a. The cell 12 has an exterior surface 14 and an interior surface 16 defining a pulp decontaminating chamber 20. The pulp decontaminating chamber 20 has an upstream pulp receiving end 22 and a downstream pulp discharging end 24. The cell 12 can be preferably oriented such that the pulp receiving end 22 is higher than the pulp discharging end 24, permitting gravity to assist in moving the pulp therethrough.

The pulp decontaminating cell 12 can be constructed of a variety of materials, such as metal or hard plastic. Preferably, at least a portion of the cell 12 is transparent and/or may be opened for ready inspection and maintenance. The pulp decontaminating chamber 20 is preferably cylindrical as shown, however, a variety of shapes will also perform satisfactorily. The chamber has a first cross section area taken along line b—b, through which a turbulent flow of aqueous paper pulp travels. Preferably, the ratio of the length of the cell 12 to the area of the cross section b—b of the chamber is about 4:1. In one preferred embodiment, the dimensions of the cell 12 are about 16 inches in length, and the cross section diameter at b—b of the pulp chamber is about 4 inches.

The invention also provides an enclosed light contaminate collection hood 30 formed within an upper portion of the decontaminating chamber 20. The light contaminate collection hood 30 can also extend from an upper exterior surface 14 of the decontaminating cell 12, in fluid communication with the pulp chamber 20. The hood 30 has an upper port 32 for purging light contaminates 26 therethrough. The upper port 32 can permit intermittent or continuous outflow or "purging" of light contaminates 26. For example, a valve 34 may be provided to control purging through the upper port 32. In addition, a vacuum means (not shown) can be provided on the upper port 32 for improving the efficiency of purging light contaminates 26, especially entrained air bubbles. In preferred embodiments, the port 32 is about ½ to ¾ inch in diameter and remains open to permit the continuous removal of light contaminates 26.

In the alternative, or in addition to the light contaminate collection hood 30, the cell 12 can have a heavy contaminate collection trough 40 on a lower exterior surface 14. The collection trough 40 is in fluid communication with the pulp chamber 20, and has a lower port 42 and means for selectively purging heavy contaminates 28 therethrough. The lower port 42 can permit intermittent or continuous purging of heavy contaminates 28. For example, a valve 44 may be provided to control purging through the lower port 42. In preferred embodiments, the lower port 42 is about ¾ to 1 inch in diameter and is intermittently open to permit the removal of heavy contaminates 28.

The invention provides a means for creating a pulp head for purging contaminates from the cell 12. By "pulp head" is meant the hydraulic energy of the aqueous paper pulp within the apparatus 10, in the form of static pressure head or velocity head. The pulp head means can be gravity or a pump, such that the pulp is provided under head to the cell 12.

The aqueous paper pulp is preferably provided under head to the receiving end 22 of the decontaminating chamber 20 in a turbulent flow (illustrated by swirling dashed lines). The turbulent flow of pulp is believed to inhibit flocking, or clumping, of the pulp fibers and contaminates. Flocking is caused by attraction of oppositely charged materials, which undesirably inhibits the removal of contaminates. The turbulent flow of pulp at the receiving end 22 is in contrast to a laminar flow (illustrated by straight dashed lines) of pulp towards the discharging end 24 of the chamber 20. As pulp moves through the chamber 20 it becomes less turbulent and more laminar throughout a transitional flow region. The transitional flow region occurs between the pulp receiving end 22 and the pulp discharging end 24 of the chamber 20 and is therefore at least partially adjacent to a portion of the light contaminate collection hood 30 and/or the heavy contaminate collection trough 40. While not wishing to be bound by theory, it is believed that the contaminates rise and fall based on specific gravity most readily in the transitional flow region. Light contaminates 26 for example, may rise directly into the collection hood 30, or may rise to the upper interior surface 16 of the chamber 20 and move therealong and then into the collection hood 30.

The cell 12 can be preferably provided with an inlet tube 50 in fluid communication with the pulp decontaminating chamber 20 at the receiving end 22 of the cell 12. The inlet tube 50 has a cross section area taken along line c—c, which is less than the cross section area at b—b of the chamber 20 to assist in creating turbulent flow in the decontaminating chamber 20 adjacent the collection hood 30 and/or collection trough 40. The turbulent flows circulate the contaminates upon entering the chamber, inhibiting flocking of the pulp. Thereafter, in the transitional flow region, light contaminates 26 can more efficiently rise to the upper collection hood 30 and/or heavy contaminates 28 can settle in the lower collection trough. Preferably, the ratio of the cross section area at b—b of the decontaminating chamber 20 to the cross section area at c—c of the inlet tube 50 is about 4:1. In one preferred embodiment, the cross section diameter at b—b of the decontaminating chamber 20 is about 4 inches and the cross section diameter at c—c of the inlet tube 50 is about 1 inch.

The cell 12 can be preferably provided with an outlet tube 54 in fluid communication with the pulp decontaminating chamber 20 at the discharging end 24 of the cell 12. The outlet tube 54 can have a cross section area taken along line d—d, which is less than the cross section area at b—b of the chamber 20. This is believed to assist in creating a laminar flow in the discharging end 24 of the decontaminating chamber 20. Preferably, the outlet tube 54 has a cross section area taken along line d—d, which is less than the cross section area at c—c of the inlet tube 50.

Preferably, the discharging end 24 of the chamber 20 provides a planar rather than tapered conical transition to the outlet tube 54 to avoid vortexing of the pulp. Preferably, the ratio of the cross section area at b—b of the decontaminating chamber 20 to the cross section at d—d of the outlet tube 54 is about 5:1, such that the cross section diameter at b—b of the decontaminating chamber 20 can be about 4 inches and the cross section diameter at d—d of the outlet tube 54 can be about ½ to ¾ inches. As shown in FIG. 2, the outlet tube 54 can also extend upwards for a predetermined length in order to reduce the velocity of the decontaminated pulp and to reintroduce turbulent flows in the decontaminated pulp.

The contaminate rise and/or fall rate can vary, usually between about 3 to 6 mm/sec, depending upon the particular composition of the pulp. Therefore, in preferred embodiments, the rate of pulp flow through the chamber can be adjusted to lengthen or shorten the duration of the decontamination procedure. In preferred embodiments, the apparatus 10 may be provided with a means for raising or lowering the discharging end 24 of the cell 12 relative to the receiving end 22 for adjusting the decline of the cell.

As shown in FIG. 2, the means for raising or lowering the discharging end 24 of the cell 12 relative to the receiving end 22 may be an arm 60 pivotally attached to the exterior surface 14 of the cell 12. The lowering/raising means permits the selective adjustment of the static head, and thus the pulp flow rate, by controlling the decline angle of the chamber 20. Therefore, a lesser decline angle results in a longer pulp retention time in the chamber 20 and increased pulp decontamination, whereas a steeper decline passes pulp therethrough more quickly and removes fewer contaminates. In preferred embodiments, the decline angle is between about 10 to 80 degrees with respect to the horizon. In another preferred embodiment, particularly when air is a primary contaminate, the decline angle is between about 40 to 80 degrees with respect to the horizon.

In a preferred embodiment of the invention, the light contaminate collection hood 30 is flexibly expandable, such as provided by a bellows 66, seen in FIGS. 2 and 3. Thus, the upper port 32 of the collection hood 30 can be maintained at approximately a constant level relative to the receiving end 22 of the cell 12 throughout a range of adjustments. This configuration is believed to assist in ensuring that adequate pulp pressure head is maintained at the upper port 32 to permit the light contaminates 26 to be self-purged through the upper port 32 throughout a range of adjustments. Purged light contaminates 26 and/or heavy contaminates 28 can be collected by waste hoses (not shown) in fluid communication with the ports 32, 42 and routed for disposal.

It should be understood that the apparatus 10 can be composed of a plurality of pulp decontaminating cells 12. A pulp server tray 70 can be provided in fluid communication with the pulp receiving end 22 of each cell 12 decontaminating chamber 20. The server tray 70 provides pulp under head to each cell 12, either by gravity or a pump. In one embodiment, the tray 70 has a top end 72 and a converging narrower bottom end 74 for maintaining head as pulp is siphoned off to upper cells 12.

The apparatus 10 can be further equipped with a plurality of pulp agitating members 76, or dams, on the server tray 70 for inhibiting flocking and maintaining pulp consistency prior to decontamination. The pulp agitating members 76 rise from the inside surface 75 of the tray 70 to a height less than the side walls 77, 78 of the tray 70. Thus, as pulp flows across the tray 70, pulp spills over each succeeding agitating member 76, rather than over the side walls 77, 78 of the tray 70.

As shown in FIG. 2, the pulp agitating members 76 can also extend to a predetermined height above the upper port 32 to ensure that a constant pulp head is maintained for purging light contaminates 26. When the light contaminate collection hood 30 is provided with a bellows 66, and a means for adjusting the decline of the cell 12, the agitating member 76 preferably remains at a higher relative level than the upper port 32 to maintain a purging head throughout a range of adjustments.

As seen in FIG. 4, a single tray 70 can preferably serve about fifty cells 12 to achieve an increased economy of scale. The longitudinal axis along of each cell 12 extends approximately perpendicularly from the plane of the tray 70. The cells 12 can be spaced in a staggered fashion in order to maximize their number. In still more preferred embodiments, multiple levels of trays 70 may be provided in a stacked configuration. For example, in one embodiment of the invention, 6 stacked trays 70 can be provided, utilizing a total of 300 such cells 12.

As seen in FIG. 5, the server tray 70 itself can be supplied by a pulp line 84 and head box 80. The head box 80 has a pulp supply end 82 adjacent the pulp line 84, and a pulp flow end 86, connected by opposed sidewalls 87, 88. When the pulp head is created by means of gravity, the head box 80 should be located above the server tray 70 and cells 12, as shown. The head box 80 can also be equipped with upper and lower agitating members 92, 94 therein to maintain an even pulp consistency prior to decontamination. In preferred embodiments, the head box 80 is about 5 feet wide, and has side walls 92, 94 extending about 2 to 3 feet in length and about 8 inches tall. The pulp supply line 82 can have a diameter of about 4 inches and the pulp flow end 86 adjacent the top end 72 of the server tray 70 can have a slotted opening about 5 feet wide and 2½ inches high.

The invention also provides a method of decontaminating aqueous paper pulp, utilizing the above described apparatus 10, comprising the step of first providing a turbulent flow of aqueous paper pulp to an elongated cell 12 having an exterior surface 14, an interior surface 16 defining a pulp decontaminating chamber 20 having a given diameter, a pulp receiving end 22, and a pulp discharging end 24 Then, purging light contaminates 26 from an enclosed light contaminate collection hood 30 within an upper portion of the pulp chamber 20, through an upper port 32 by a means for selectively purging the light contaminates 26 therethrough. The means for selectively purging the light contaminates 26 can be gravity or a pump. The upper port 32 is disposed such that light contaminates 26 are purged therethrough by a pulp head. Finally, the method comprises collecting decontaminated pulp from the discharging end 24 of the chamber 20 for paper production.

In preferred methods, the light contaminates 26 are purged continuously through the upper port 32, but can alternatively be purged at selected intervals through the upper port 32. In preferred embodiments, the method further comprises creating a pulp flow gradient in the decontaminating chamber 20 between turbulent flows adjacent the receiving end 22 and laminar flows adjacent the discharging end 24, such that a transitional decontaminating flow region is created adjacent the collection hood 30 and/or the collection trough 40. The invention also provides a decontaminated pulp product made by the above process.

EXAMPLE 1

An apparatus for decontaminating aqueous paper pulp is constructed as an elongated, cylindrical cell about 16 inches in length. The cell has an exterior surface and an interior surface defining a pulp decontaminating chamber about 4 inches in diameter. The apparatus also provides an enclosed light contaminate collection hood on the upper exterior surface of the decontaminating cell, which is in fluid communication with the pulp chamber. The hood has an upper port about ½ inch in diameter for continuously purging light contaminates therethrough.

The cell also has a heavy contaminate collection trough on the lower exterior surface. The collection trough is in fluid communication with the pulp chamber, and has a lower port and a valve for selectively purging heavy contaminates therethrough about 1 inch in diameter.

Pulp is provided to the decontaminating chamber under head from an inlet tube at the upstream pulp receiving end and permitted to flow downstream through the chamber under gravity to the opposite pulp discharging end. The turbulent flow of pulp enters the cell and becomes increasingly laminar as it travels towards the discharging end.

The inlet tube has a cross section area of about 1 inch, which is less than the cross section area of the chamber to further create turbulence in the decontaminating chamber. The turbulent flow provides mixing, deflocking agitation to the pulp, which initially circulates the contaminates upon entering the chamber. As the pulp travels through the chamber, the flow becomes less turbulent and increasingly laminar, permitting light contaminates to rise to the upper collection hood, where they are continuously purged out an upper port. Heavy contaminates settle in the lower collection trough, where they are periodically purged by opening the lower valve about every 15 minutes.

To increase the amount of contaminates removed from the pulp, the apparatus is provided with a pivitally mounted arm for raising or lowering the discharging end of the cell relative to the receiving end. The arm is raised to decrease the decline, thus, converting lowering the velocity and causing increased separation of contaminates from paper fiber. The light contaminate collection hood has a flexibly expandable bellows, so that the upper port of the collection hood is maintained at approximately a constant level relative to the receiving end of the cell throughout a range of adjustments.

I claim:

1. A method for removing light contaminates from aqueous paper pulp, said light contaminates having a specific gravity less than said aqueous paper pulp, comprising:

a. providing aqueous paper pulp under head to an elongated cell having an exterior surface, an interior surface defining a pulp decontaminating chamber having a first cross section area, a pulp receiving end, and a pulp discharging end;

b. purging light contaminates from an enclosed light contaminate collection hood within an upper portion of the decontaminating chamber in fluid communication with said decontaminating chamber, through an upper port by a means for selectively purging said light contaminates therethrough, wherein said upper port is disposed such that light contaminates are purged therethrough by pulp head; and, c. collecting decontaminated pulp from said discharging end of said decontaminating chamber for paper production.

2. The method of claim 1, wherein said light contaminates are purged continuously through said upper port.

3. The method of claim 1, wherein said light contaminates are purged at selected intervals through said upper port.

4. The method of claim 1, further comprising creating a pulp flow gradient in the decontaminating chamber between turbulent flows adjacent the receiving end and laminar flows adjacent the discharging end, such that a transitional decontaminating flow region is created adjacent the collection hood and/or the collection trough during said purging step.

5. The method of claim 1, wherein said pulp head is delivered by gravity.

6. The method of claim 1, further comprising adjusting the orientation of said pulp receiving end relative to said pulp discharging end to change the pulp head.

7. The method of claim 1, further comprising creating a vacuum for assisting the purging of light contaminates through the upper port.

8. The method of claim 1, further comprising purging heavy contaminates at selected intervals from a heavy contaminate collection trough within a portion of said decontaminating chamber in fluid communication with said heavy contaminate collection through having a lower port for purging said heavy contaminates therethrough.

* * * * *